May 22, 1962 S. A. MALTHANER 3,035,667
BRAKE DRUM
Filed Nov. 4, 1959
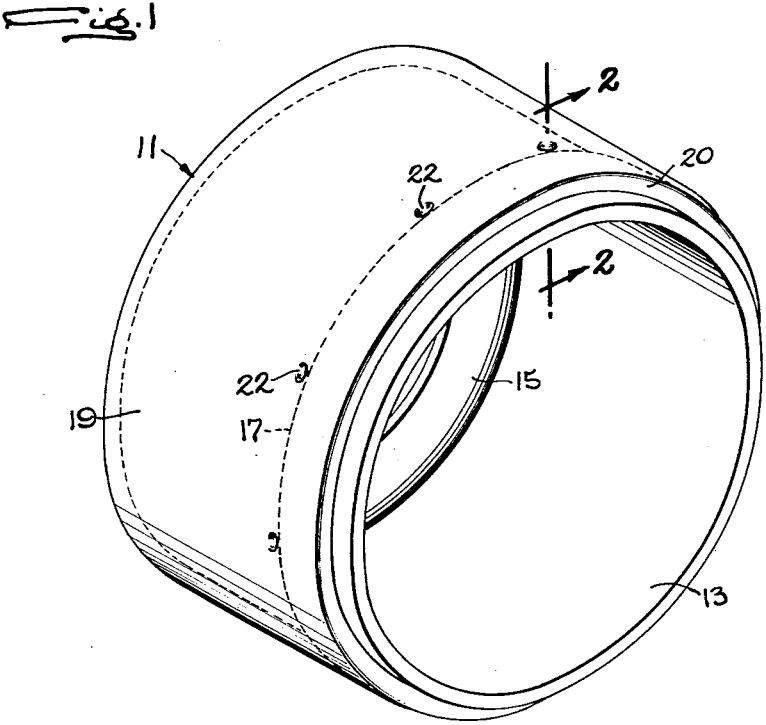
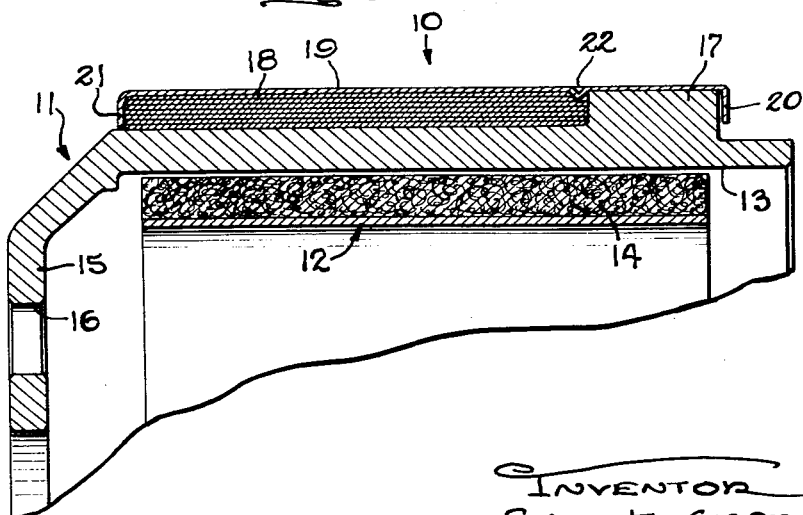
INVENTOR
Sylvester A. Malthaner
by Wolfe, Hubbard, Voit & Osann
ATTORNEYS 3,035,667
BRAKE DRUM
Sylvester A. Malthaner, Rockford, Ill., assignor, by mesne assignments, to Kelsey-Hayes Company, Detroit, Mich., a corporation of Delaware
Filed Nov. 4, 1959, Ser. No. 850,820
2 Claims. (Cl. 188—218)

The present invention relates to brake drums of the type utilized with a friction element to control the motion of a rotating part and, more particularly, to the type of drum wherein the friction element is disposed within the drum and is operable to be expanded outwardly into gripping engagement with the internal surface of the drum to slow down or stop the rotation of the drum.

The primary object of the invention is to utilize the heat developed by the relative rubbing between the friction element and the internal surface of the drum in obtaining substantially equal temperatures at both the inner and outer peripheries of the drum and thereby to eliminate heat checks and failures due to the uneven thermal conditions in various parts of the drum.

Another object is to accomplish the foregoing by retarding the dissipation of heat from the outer periphery of the drum by means of insulation whereby the drum tends to heat up evenly throughout.

Other objects and advantages of the invention will become apparent from the following detailed description taken in connection with the accompanying drawings, in which FIGURE 1 is a perspective view of a brake drum embodying the novel features of the present invention.

FIG. 2 is a fragmentary sectional view taken along line 2—2 in FIG. 1.

The present invention is shown in the drawings for purposes of illustration embodied in a friction brake 10 for use on a vehicle wheel or the like (not shown) and operable to control the rotary motion of the latter. The brake 10 comprises a drum 11 mounted to rotate with the wheel and a nonrotatable friction element such as a conventional brake shoe 12 disposed within the drum and mounted to be expanded radially into gripping engagement with the internal surface 13 of the drum. A layer of friction material 14 is fixed to the outer periphery of the friction element 12 on the surface engaging the internal surface 13 of the drum 11.

To facilitate mounting the drum on the wheel, an inturned flange 15 is formed on one end of the drum 11. Holes 16 are bored in the flange through which bolts project and are threaded into the wheel or other device whose rotary motion is to be controlled. At the opposite end of the drum 11, the open end, a ridge 17 is formed to project outwardly from the outer periphery of the drum to reinforce the open end of the drum and reduce the tendency for the drum to bell outwardly when the friction element 12 is forced against the internal surface 13 of the drum.

When brakes of the above character are utilized on trucks or other relatively heavy vehicles, their performance is generally unsatisfactory due to the drums breaking after relatively short periods of service use. This has been found to be caused by heat checking of the drums resulting from the high temperatures developed from the heat generated upon the application of the brakes due to the friction between the rubbing surfaces. The fractures of the drum take place through these heat checks because of the high stress concentration at these points. Prior efforts to reduce checking and hence failure have been aimed at dissipating the heat as rapidly as possible and various means have been provided for this purpose.

I have discovered that failure of brake drums in this manner is due not to the mere presence of heat but rather to the uneven forces produced as a result of uneven thermal conditions and temperatures in various parts of the drum. That is to say, the temperature of the drum is greatest adjacent the internal surface 13 which is in engagement with the friction element 12 and decreases progressively outwardly to the outer periphery. This results in greater expansion of that part of the drum adjacent the inner periphery than the part of the drum adjacent the outer periphery thereby producing forces in the drum in addition to those resulting from the normal operation of the brake.

Based on this discovery, the present invention contemplates maintaining even temperatures throughout the drum by insulating the outer diameter of the drum to retard the dissipation of heat from the outer diameter and utilizing this heat to equalize the temperatures throughout the drum. To this end, insulating material is applied to the drum so as to encircle the outer periphery and retain the heat developed by the friction between the friction element 12 and the internal surface 13 of the drum. This results in comparatively higher temperatures at the outer periphery so that the temperature differential between the inner and outer peripheries is substantially reduced.

In the present instance, the insulation comprises sheets of insulating material 18 such as sheets of asbestos or the like wrapped around the outer periphery of the drum 11 between the ridge 17 and the closed end of the drum. Sufficient layers of the insulating material are wrapped around the drum 11 to obtain an outer diameter substantially equal to the outer diameter of the ridge 17 (FIG. 2). A steel ring 19 telescopes with the drum to overlie the sheets and thereby protect the relatively soft insulating material and to hold the latter on the drum.

In order to hold the steel ring 19 and the insulating material 18 in place and prevent endwise shifting of the ring and material relative to the drum, the steel ring 19 overlies the ridge 17 and has abutment surfaces formed thereon which engage either side of the ridge to locate the ring in a fixed position relative to the drum. Relative movement of the insulating material 18 along the drum 11 and the ring 19 is prevented by a second abutment surface formed on the ring and engaging one end of the insulating material to hold it in position against the inner side of the ridge.

Herein, these abutment surfaces are provided by bending the ends of the ring 19 laterally inwardly to form flanges 20 and 21 whereby the cross section of the ring is of a generally U-shape. When the ring 19 is disposed on the drum to overlie the insulating material and the ridge, one of the flanges engages the side of the ridge 17 adjacent the open end of the drum 11 and the other abuts the end of the insulating material 18 adjacent the closed end of the drum and thereby positions it between the ridge and the flange. When thus mounted, axial movement of the ring 19 relative to the drum 11 is prevented in one direction by abutment of the flange 20 and the ridge 17 and in the opposite direction by abutment of the flange 21 and the end of the insulating material which, in turn, engages the ridge.

To insure against relative movement between the ring 19 and the drum 11 axially toward the open end of the drum whereby the relatively soft insulating material 18 would be damaged, an additional abutment surface is formed on the ring to engage the side of the ridge opposite the flange. Herein, this surface is formed by indentations 22 made in the outer periphery of the ring 19 and projecting downwardly into abutment with the ridge 17 adjacent the inner side thereof. The ring 19 is thus held in a fixed position relative to the ridge 17 and thereby to the drum 11 by the flange 20 and the indentations 22 engaging opposite sides of the ridge.

It will be apparent that a brake constructed as described above may be simply and inexpensively manufactured while permitting the maintenance of a small temperature gradient throughout the thickness of the drum. The problems of heat checking are thereby greatly decreased as well as the thermal forces resulting from unequal expansion in various parts of the drum. Due to this, drums constructed in the manner described have a substantially increased service life as compared to the conventional, uninsulated brake drum.

I claim as my invention:

1. A brake drum comprising a cylindrical drum having an internal friction surface, a ridge formed on the outer periphery of said drum adjacent one end to project outwardly therefrom, an annulus of insulating material encircling said drum and engaging the outer periphery of the drum between said ridge and the end opposite said one end, a ring surrounding said drum to overlie said insulating material and said ridge, and abutment surfaces formed on said ring to engage said ridge and said annulus to prevent endwise shifting of the ring and annulus relative to said drum.

2. A brake drum comprising, a cylindrical drum having an internal friction surface, an annulus of heat resistant and heat insulating material encircling said drum and engaging the outer periphery thereof to overlie the major portion of said friction surface, a ring surrounding said drum to overlie said annulus, and opposed axially facing abutment surfaces formed on said ring and said drum to prevent endwise shifting of the ring and annulus relative to the drum.

References Cited in the file of this patent

UNITED STATES PATENTS

| | | |
|---|---|---|
| 1,833,413 | Chase | Nov. 24, 1931 |
| 2,065,088 | Mueller | Dec. 22, 1936 |

FOREIGN PATENTS

| | | |
|---|---|---|
| 249,358 | Great Britain | Mar. 25, 1926 |
| 316,372 | Great Britain | Aug. 1, 1929 |